Patented Nov. 19, 1929

1,735,987

UNITED STATES PATENT OFFICE

ARTHUR W. ALLEN, OF BERKELEY, CALIFORNIA

CRYSTALLIZATION PROCESS

No Drawing.   Application filed September 12, 1927. Serial No. 219,185.

The invention relates to the crystallization of a substance from warm or hot plant liquors, and is of particular application in connection with the recovery of commercial nitrate from Chilean caliche. This case is a continuation in part of Case No. 128,512, filed Aug 10, 1926.

It is the object of my invention to hasten the time of cooling ordinarily necessary, thereby reducing the extent of the crystallizing plant required and the amount of valuable product and valuable solution in the state of process.

It is the further object of my invention to recover a large proportion of the heat dissipated into the atmosphere from heated solutions under existing conditions, and to transfer this heat to solutions or water used in the extraction and displacement phases of the lixiviation process.

It is the further object of my invention to obviate the draining of commercial nitrate crystals as at present practiced and the hand labor required to load these to cars and to deliver the cars to the centrifugals used for drying the product.

It is the further object of my invention to provide a free crystal product of substantially uniform particle size, by means of a process the flexibility of which will permit a reasonable variation in this respect.

It is the further object of my invention to carry the cooling of the liquor below the temperature obtainable by exposure in atmospheric cooling vats, without the use of artificial means of refrigeration. This additional cooling permits an increase in yield of commercial nitrate from a given volume of solution; it results in the return of less nitrate to the plant in the mother liquor, and it provides a solution with greater nitrate-abstracting powers.

By the customary process practiced in Chile for the recovery of commercial nitrate from plant liquors, the concentrated solution is sent to crystallizing vats or bateas, in which it remains an adequate time to permit cooling to atmospheric temperature and the deposit of a sufficiency of crystals. The cold mother liquor, or agua vieda, is then drained from the crystals and sent to the lixiviation plant, to be reheated and used as a solvent for more nitrate and for the production, by the evaporation of contained water, of a caldo, as the final concentrated effluent is termed. The drained commercial nitrate crystals, which are shoveled from the batea to apron plates or delivered direct to cars, may be subsequently treated in centrifugals, for the removal of adherent mother liquor, and then washed with water; or they may be sent direct to the storage and bagging platform.

The crystallization and recovery stage of operations is inefficient and wasteful. Immense batea capacity is needed to insure a sufficient drop in temperature of the solution, the production of an adequate drop of crystals and a mother liquor of relatively low nitrate content. The nitrate solution is in a sluggish condition during the cooling operation, with thermal circulation at a minimum because of (1) viscosity; (2) the insulation of the bottom and sides of the batea by an adherent layer of crystals, and (3) the insulation of the surface by the production of a skin. An abnormal time of exposure, usually from 8 to 10 days, is necessary to effect an adequate reduction in temperature, especially in the summer months, involving the retention in process of large quantities of nitrate and nitrate-bearing solution. All the heat in the original liquor, as well as the heat of crystallization, is dissipated into the atmosphere, thereby occasioning heavy fuel consumption, abnormal recovery expense, and high cost of nitrate to the ultimate consumer. Laborers are required to remove the deposited nitrate from the crystallizing vats or bateas, after more time has been lost in draining the material to a point permitting them to handle a fairly dry product which product, incidentally, is in an entirely unsuitable condition for the centrifugals, consisting as it does of drained crystals of various sizes, and cemented to a variable extent. After time has been spent in draining the nitrate crystals so that they may be handled by the workmen, it is advisable to add some of the drained mother liquor to the mass, for lubrication purposes and to permit the flow control to the centrifugal basket. The process therefore is inefficient from every standpoint.

The crystallization of commercial nitrate from caldo by means other than by the customary process employed in Chile to date has presented considerable difficulties. If usual methods of heat exchange be employed, whereby, for instance, the temperature of cold liquor or water is raised during passage through pipes immersed in the heated concentrated solution, a rapid and adherent deposit of crystals occurs on the cooling surfaces. If agitation be used to increase the circulation and movement of the hot liquor, or other means be provided to prevent the growth of crystals thus, the resultant nitrate is extremely fine grained and of high associated solution content, even after draining.

My researches in Chile and elsewhere have convinced me that an accelerated transfer of heat from the upper surface of the solution will result in the prompt formation of crystals, which may then be permitted to grow during their fall by gravity through a predetermined depth of solution. An important phase of my invention involves the flooding of the surface of the hot concentrated liquor, avoiding mixture, with another liquid of lower temperature and lower specific gravity; or, conversely, the delivery of the hot liquor underneath a sufficiency of the colder, heat-extracting liquid. This added upper layer may consist of any suitable and cheap chemical liquid or oil that is unaffected to any appreciable extent by the temperature and contact conditions prevailing. As a simple application of this phase of the invention, the heat-abstracting liquid used may be the mother liquor resulting from the final cooling of the caldo.

For the full utilization of the basic idea, however, it is necessary to adopt positive means to remove the absorbed heat from the heat-abstracting layer; and for this purpose I may provide in this layer a sufficiency of piping to insure heat transfer to colder solutions or water; or such heat transference may be effected in a separate exchange apparatus, operating on the customary counter-current principle. By such means I avoid all crystallization and consequent insulation on the surface of piping or other metallic conducting elements used to convey the liquid to which a transference of the heats of solution and crystallization is desired. The vessel used for the crystallizing operation may be rectangular or cylindrical, with a conical bottom leading to a central discharge. The depth of the apparatus will depend on the size of the crystal required and the speed with which cooling must be performed. The vessel is adequately insulated on the sides and bottom, to prevent the growth of crystals thereon.

It will not be necessary to effect complete cooling in this apparatus, although means may be provided to insure this. Under normal conditions, however, when sufficient heat has been transferred to the circulating solution and water so that a cooled but not completely chilled solution results, the heat-transfer layer may be siphoned off to storage and the crystals allowed to flow direct to the centrifugal bins, direct or via a storage container. The remainder of the solution, which may contain some fine nitrate crystals in suspension, which serve as "seed," is then sent to an insulated tank equipped with agitator arms. The centrifugal machines are then given a load of crystals roughly in proportion to the amount of nitrate crystallized in the crystallizing apparatus described, as compared with the total amount of nitrate to be crystallized from the liquor. Without stopping the centrifugal, a sufficiency of the liquor and fine crystals from the agitator tank is then allowed to flow onto the distributing disc or discs, the cooling and evaporating action resulting being accelerated by the provision of vanes across the bottom of the basket, of a dimension that will not interfere appreciably with the discharging of crystals from the apparatus. These vanes are arranged so as to deflect air into the centrifugal. The chilled effluent from the centrifugal during this stage of operations constitute the mother liquor to be returned to the plant, via the coils submerged in the heat-abstracting layer above the charge of hot or warm solution in the crystallizing apparatus, or via a separate heat exchanger. The crystals formed by the rapid chilling of the solution during its passage from the distributing discs in the centrifugal are held on and in a layer of nitrate crystals previously deposited against the screen of the basket. The centrifugal therefore is made to serve the dual purpose of crystallizer and collector. The operation is concluded by discharging, with or without water washing, in the usual manner.

The first phase of the invention is also suitable for application by continuous methods, whereby the amount of solution and nitrate crystals in process may be still further reduced. As an example: In the salt industry, what is known as a grainer is used to effect the evaporation of water from brine. This apparatus consists essentially of a long shallow trough, the bottom of which at one end slopes towards and above the surface of the liquor. A connected submerged system of rakes, with a hinged connection extending up the discharge apron, scrapes the salt forward as formed, and finally delivers it up the incline at the discharge end. The heating of the liquor is effected by steam pipes submerged therein.

In the adaptation of this apparatus for the continuous crystallization of commercial nitrate from heated and flowing nitrate liquors, I discard the steam pipes and I arrange in the upper part a horizontal layer of small pipes through which is passed cold mother liquor or water, and I submerge these pipes in the heat-abstracting liquid, of a character previously described, that forms a surfacing on the nitrate liquor to be cooled. Or the submerged pipes may be dispensed with and the heat-abstracting liquid may be circulated counter-current to the flow of the liquid to be crystallized, the transferred heat being ultimately absorbed by the use of an auxiliary heat-exchange apparatus of the customary type, operating on the counter-current principle.

The nitrate liquor passes in continuous flow into and out of the apparatus, being delivered at the liquor level at one end and discharged at the liquor level at the other. The sides and bottom of the apparatus are insulated, to prevent the growth of crystals thereon. The raking mechanism is entirely submerged except at the discharge end; and I prevent contact of its exposed portion with the heat-abstracting liquid by arranging a baffle near the discharge end and across the apparatus, extending vertically above and below the heat-abstracting liquid on the one side and above the nitrate liquor on the other. The cooled nitrate liquor being discharged from the surface may thus be kept separated from the heat-abstracting liquid. A similar baffle may be arranged at the feed end of the apparatus, or the incoming heavier nitrate liquor may be delivered directly into the lighter heat-abstracting liquid.

As previously mentioned, the invention permits a radical reduction in the cost of crystallizing commercial nitrate and the introduction of economies in the general treatment of caliche or nitrate-bearing rock. An important application of the invention refers to the adoption of the process for liquors that have not been raised so far as possible to maximum practicable concentration of nitrate at maximum atmospheric temperature, which is customary practice under existing conditions. With a total loss of contained heat as well as the heat of crystallization, together with the heavy expense involved for the transfer of the crystals from the bateas or crystallizing vats, it has always been recognized as essential to reduce the bulk of the liquor by the evaporation of contained water, and thus to secure a deposit of commercial nitrate crystals of maximum quantity per unit volume of caldo. Such concentrated liquor, however, is handled with great difficulty, even in open launders, which have to be cleaned by hand of deposited crystals almost continuously.

In a technological handbook published in 1921 ("The Recovery of Nitrate from Chilean Caliche") available for inspection in the Library of Congress, I adversely criticized existing methods of nitrate manufacture in Chile, especially in regard to the enrichment of the charge by the evaporation of liquor in contact with it. My researches had at that time led to the pioneer application of what may be termed metallurgical bulk leaching and the development of an alternative process, since in successful application at the Delaware plant of the du Pont Nitrate Co., Taltal, Chile, involving (1) the finer crushing of the caliche or nitrate-bearing rock; (2) the provision of an adequate support for the charge, in place of the customary punched-plate crinolina; (3) the heating of the solvent solution out of contact with the charge, and (4) its upward percolation through the material. With no more heat obtainable than is available by the pre-heating of the charge and by the use of percolating liquors entering at maximum atmospheric temperature, it is obvious that concentration of the solution can not be carried to the point secured in the application of the old process, because evaporation does not take place. The newer process, however, permits (1) a greatly improved extraction of nitrate; (2) shorter time of treatment; (3) the successful treatment of the entire mass, without removal of fines; (4) the production of clear effluent solutions throughout; (5) the use of less wash water with normal raw material; (6) the ability to adopt larger units and the mechanical discharging of residue, and (7) the accurate accounting of nitrate extractions and losses. Even if the existing small cachuchos or boiling tanks, from which all internal heating and other fittings have been removed but which must be emptied of residue by hand, are still employed in the application of the new process described in the handbook referred to, the other advantages are more than sufficient to counterbalance the extra cost involved by the concentration of the effluent liquors in efficient vacuum apparatus and the production of a concentrated solution; which, also by reasons of economy, may be crystallized in the existing bateas. The inefficiency of batea crystallization practice has already been stressed, however; and the criticism applies whichever method of solution concentration be employed.

By the application of the new extraction process it has been found possible in practice to increase the nitrate content of a heated solution by about 100 grams per liter during its passage through a charge of residue or ripio from the standard process; and 150 grams or more per liter, according to the percentage of nitrate present, from normal raw material. The present invention as applied to the crystallization of commercial nitrate from such liquors permits (1) the avoidance of vacuum-pan evaporation as a concentration step in the modified process;

and (2) the direct production of a commercial nitrate by the cooling of and the recovery of heat from the initial liquors resulting from the application of the process referred to in the handbook mentioned. If a higher-grade or chemically-pure product is desired, these crystals may be purified by re-dissolution and re-crystallization. Any excess of water accumulating in the system, as a result of less being discharged as moisture in residue and in nitrate than is needed for displacement purposes, may be evaporated by solar methods, for which ideal conditions prevail in the Chilean nitrate pampa.

Although to date the utilization of existing equipment, erected originally for the application of a process involving heating of the solvent solution in contact with the charge, has restricted the application of the new extraction process to the use of maximum atmospheric-temperature solutions and the production of a caldo in an independent evaporator unit, this new process is obviously suitable for use with any practicable temperature range, even if the refrigeration of the resultant solution is desirable or necessary. In such event, and by utilizing the present invention, the final cooling may be achieved by passing refrigerated brine through the metallic conducting elements in contact with the heat-abstracting liquid, either in a grainer or in an auxiliary heat exchange apparatus, or in an intermittent-process container.

The present invention, although described in its particular application to the crystallization of commercial nitrate from heated solutions, such commercial nitrate comprising sodium and potassium nitrates and a variable amount of other crystalline compounds as impurities, may be applied for many other purposes of a similar or allied character, and by numerous alternative methods of utilization; and I claim all variations within the scope of the invention.

I claim, therefore:

1. In a process for the crystallization of a substance from a heated liquor, the step of submerging such liquor under another liquid of lower temperature and lower specific gravity.

2. In a process for the crystallization of a substance from a heated liquor, the step of abstracting heat from such liquor by the provision of a supernatant layer of a liquid of lower temperature and lower specific gravity; and the further provision of means for the transfer of such abstracted heat to another liquid caused to pass through a metallic conducting element in contact with the heat-abstracting liquid.

3. In a process for the crystallization of a substance from a heated liquor, the recovery of heat in three stages, by the utilization of a heat-liquid interface for the first step, a liquid-solid interface for the second step, and a solid-liquid interface for the third step.

4. In a process for the crystallization of a substance from a heated liquor, the step of delivering such liquor into an insulated conical-bottomed container, causing the liquor to be submerged under another liquid of lower temperature and lower specific gravity, immersing in this, the heat-abstracting liquid, a sufficiency of metallic conducting elements through which a cooler liquid is passed.

5. In a continuous process for the crystallization of a substance from a heated liquor, involving the submergence of such liquor under another liquid of lower temperature and lower specific gravity, the step of causing an acceleration of heat and crystallization by the countercurrent movement of the fluids in direct contact.

ARTHUR W. ALLEN.